April 27, 1937. R. L. SHUMAN 2,078,421
MANUFACTURE OF ALKYL AND ARYL PHOSPHATES
Filed April 13, 1934
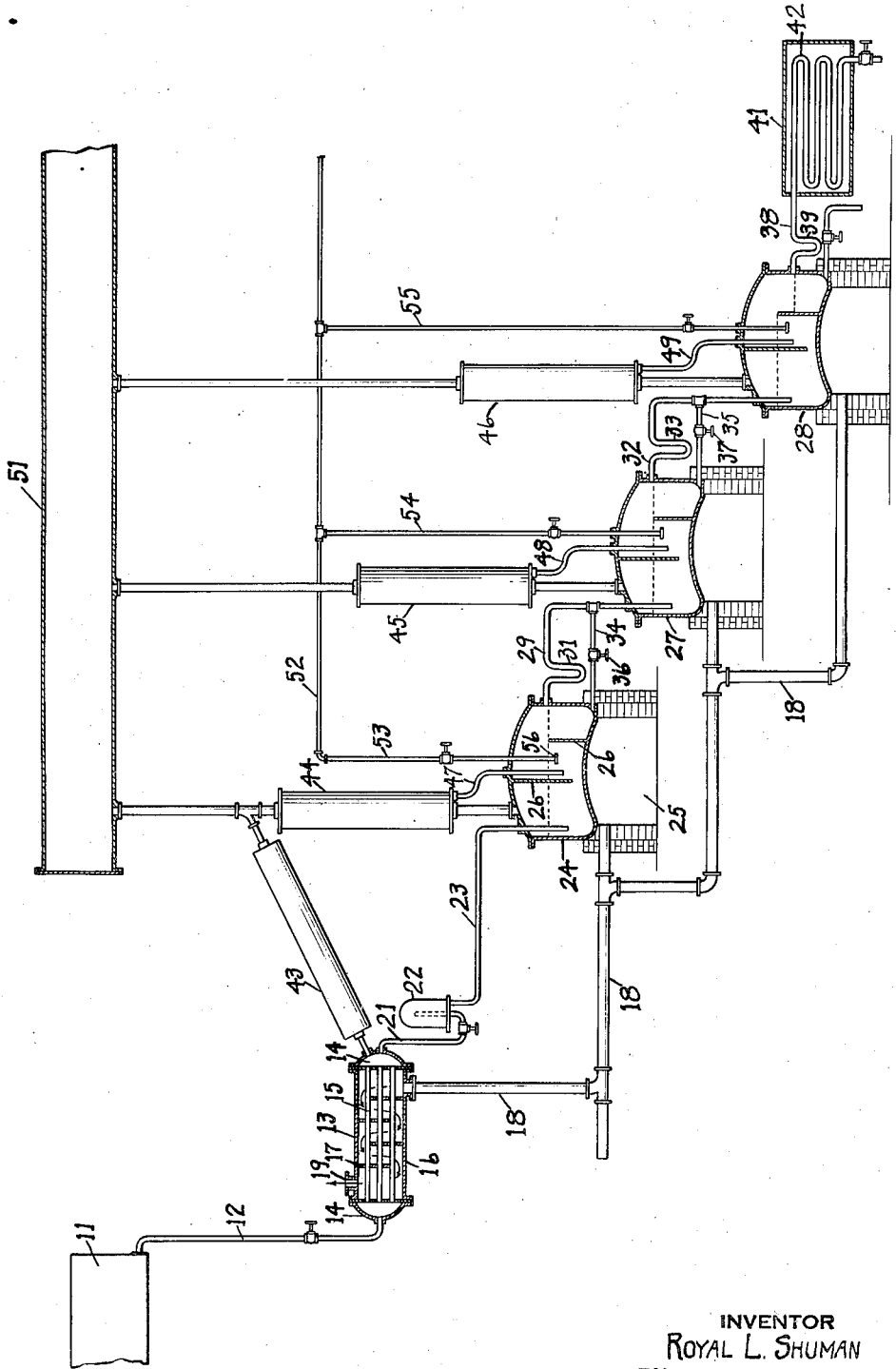
INVENTOR
ROYAL L. SHUMAN
BY
ATTORNEY Patented Apr. 27, 1937

2,078,421

UNITED STATES PATENT OFFICE 2,078,421

MANUFACTURE OF ALKYL AND ARYL PHOSPHATES

Royal L. Shuman, Newark, N. J., assignor to Celluloid Corporation, a corporation of New Jersey Application April 13, 1934, Serial No. 720,448

8 Claims. (Cl. 260—99.20)

This invention relates to the method of and device for making alkyl and aryl phosphates by a continuous process in the reaction stage and more particularly to the tri-alkyl and tri-aryl esters of phosphoric acid such as triphenyl phosphate, tributyl phosphate, tricresyl phosphate, trixylenyl phosphate, the mixed esters or aliphatic polyhydric alcohol-aryl phosphate, etc.

An object of the invention is the economic and expeditious making of alkyl, aryl and mixed alkyl-aryl esters of phosphoric acid by a continuous process well adapted to commercial scale operation. Another object of the invention is the construction of an efficient device for carrying out the reaction stage of the ester formation. Other objects of the invention will appear from the following detailed description.

In the drawing there is shown a device for carrying out this invention in a continuous manner. The drawing is a side elevation partly in section of such a device.

In accordance with this invention, the rate of production is increased over 100% as compared with the batch processes formerly used. A device as herein described will produce as much in a unit length of time as seven batch process devices of equivalent size. Thus, there is a reduced installation and maintenance cost, a saving of floor space and a reduction in number of attendants required.

Another advantage of this invention is that it is more simple in procedure than the batch processes formerly employed and the materials pass through the system with more regularity. The weighing and mixing are simplified and a more intimate mixture of the ingredients of reaction are obtained; thus mistakes are less likely to occur and more uniform products are obtained.

Another advantage of this invention is that the retorts or reaction chambers may be maintained at a constant temperature. This results in much less severe service for the equipment and lower maintenance costs. There is also an economy of heat as much less heat is wasted in holding the retorts at constant temperature than in varying the temperature intermittently from say 50° to 350° C. or 400° C. in a period of a few hours, as is the practice in the batch process. There is also the advantage of a more regulated heat treatment without the danger of overheating or underheating in the various stages of reaction. Because of the possibility of more accurate control of the factors of the chemical reaction, a product much lighter in color and of greater uniformity is obtained.

The process of manufacturing the phosphoric acid esters is naturally divided into two parts, first the reaction or formation of the esters in retorts or reaction chambers and second the purification of the crude formed product. This invention is directed primarily to the first or reaction stage of the process. However, as this stage has an influence upon the second stage, the invention generally is applicable to both stages with the major changes from known processes being in the first stage.

According to this invention, I produce the alkyl and/or aryl esters of phosphoric acid by a continuous process by passing a mixture of definite proportions of the reacting substances through a series of retorts, each retort being individually heated and to a temperature above that of the preceding retort of the series. These retorts are adapted to function correlatively and as a unit.

It will be noted from the drawing that the equipment consists essentially of the following: Mixing and weighing tanks, three or more retorts in series located preferably at different levels, so that the raw materials and the intermediate products flow through the system by gravity, with a reflux condenser for each retort, a cooler and storage tank. The retorts may be reaction kettles of any suitable capacity, heated in any suitable manner, such as by a gas or oil open flame, by electrical resistance or induction coils or by closed coils or jacketed reaction kettles containing superheated steam. These retorts are adapted to be maintained, independently of each other, at a constant temperature. The temperature will vary according to the number of retorts and the material being formed. Thus in employing three retorts and forming tricresyl phosphate from cresylic acid and phosphorus oxychloride, the first retort may be heated to 150° C., the second one to 225° C. and the third one to 300° C. or more. These temperatures will necessarily vary according to the materials being treated.

As an illustration and not as a limitation the following factors necessary for a cycle of operation are given. In conducting the cresol phosphorus oxychloride reaction for making tricresyl phosphate, the conditions applicable are:

Size of kettles_____ 150 gallons each
Time of flow thru entire system__ 3 to 9 hours
Time of flow thru one kettle_____ 1 to 3 hours For making other esters the rate of flow may vary considerably, depending on the reaction velocity of the components.

In accordance with this invention, any of the esters of phosphoric acid may be formed. For the purpose of description, however, the invention is described in relation to the making of phenolic esters of phosphoric acid which follows the general formula $$3XC_6H_yOH + POCl_3 = XC_6H_yO)_3PO + )3HCl$$

where X is hydrogen or any aliphatic side chain or chains and $y$ is 4 or less, depending on the number of X radicals. Any of the hydroxyl derivatives of the benzene series classified under the name phenols may be employed, e. g. phenol itself, cresols, xylenols and the higher homologues of the benzene series. The ester may be formed of one of these hydroxy-benzenes or a mixture of two or three, or all of them, such as is found in coal tar acids, commercially sold under the name of cresylic acid. The products resulting from the reaction may be homogeneous phosphoric esters of hydroxyl derivatives of the benzene series such as the phenols, or they may be mixed esters of phosphoric acid depending upon the materials used. They are generally known and described as aryl phosphates or mixed phosphates.

The structure of these esters may be represented as follows:

The homogeneous phosphoric acid ester as $$PO{\overset{\diagup OR}{-}OR}{\underset{\diagdown OR}{}}$$

where R refers to a radical of any one of the phenols.

The mixed phosphoric acid ester of the phenols as $$PO{\overset{\diagup ORx1}{-}ORx2}{\underset{\diagdown ORx3}{}}$$

where $Rx1$, $Rx2$, and $Rx3$ represent different radicals of the phenols.

The mixed phosphoric acid esters of alkyl and aryl compounds as $$PO{\overset{\diagup ORx4}{-}ORx5}{\underset{\diagdown ORx6}{}}$$

where $Rx4$, $Rx5$ and $Rx6$ represent different radicals of the phenols, aliphatic hydroxy compounds, alkyl phenyl radicals, or $Rx4$, $Rx5$ and $Rx6$ may be a single alkyl radical such as ethyl glycol, as more fully described in U. S. application 706,360 filed January 12, 1934.

This invention is applicable to the formation of any of the above esters of phosphoric acid, by modification, according to the following types of reactions for example.

1. $3CH_3C_6H_4OH + PCl_5 = (CH_3C_6H_4O)_3PCl_2 + 3HCl (CH_3C_6H_4O)_3PCl_2 + H_2O = (CH_3C_6H_4O)_3PO + 2HCl$

2. $3CH_3C_6H_4OH + PCl_3 + Cl_2 = (CH_3C_6H_4O)_3PCl_2 + 3HCl$
$(CH_3C_6H_4O)_3PCl_2 + 2NaOH = (CH_3C_6H_4O)_3PO + 2NaCl$

3. $3CH_3C_6H_5OH + PCl_3 = (CH_3C_6H_4O)_3P + 3HCl$

In other words, according to Equation (1) cresol reacts with phosphorus pentachloride to form tricresyl phosphite dichloride plus hydrochloric acid. The tricresyl phosphite dichloride is made in accordance with this invention using temperatures in the retorts of 50° C., 75°-100° C. and 100°-125° C. respectively. This compound is then reacted with water as shown in the secondary equation.

These esters are formed by mixing the reacting compounds in substantially chemically equivalent amounts and subjecting the same to a temperature which is gradually increased toward the end of the reaction. It has been found that there are some advantages in passing carbon dioxide gas into the retorts during the progress of the reaction or to operate under a high vacuum. This is especially true in the making of phosphoric acid esters from aliphatic hydroxy compounds or the mixed esters containing at least one aliphatic hydroxy radical. The advantage of either of these methods is to facilitate the escape of hydrochloric acid gas from the system, thus preventing hydrolysis or the formation of intermediate products, and keeping air from contacting with the heated material in the retorts. This results in a product which is much lighter in color and more true to the calculated product desired.

Suitable catalysts, such as aluminum chloride and zinc chloride, may be added to the retorts to hasten the reaction or to make possible the performance of the reactions at lower temperatures.

In the drawing 11 is a mixing tank wherein the proportions of ingredients are mixed. This tank is connected by a pipe line 12 to a preheater 13 consisting of spaced headers 14 and their connecting tubes 15 that may be surrounded by a casing 16 having baffle plates 17 suitably positioned therein. The heated gas from the various heating chambers is carried to the preheater or heat exchanger 13 by means of flues 18 where it preheats the liquids flowing from the mixing tank and then passes out of the system through the vent 19 that may lead to any suitable means for removing gases.

Connected with the preheater 13 by a pipe line 21 is a suitable flow meter 22 where the quantity of liquid flowing to the reaction chambers may be regulated. The flow meter is connected by a feed line 23 to a retort or reaction chamber 24. The reaction chamber 24 may be of any suitable size and shape. However, it is preferably constructed so that it may be sealed air tight and is equipped with suitable means for heating it, shown in the drawing as a combustion chamber 25. The reaction chamber may be divided by suitable baffle plates 26 such that the fresh incoming liquid is partially segregated from the partially reacted liquid leaving the chamber. This chamber is connected with a second chamber 27 which may be in all respects a duplicate of chamber 24. The second chamber 27 may be connected with a third chamber 28 of similar design. There may be any suitable number of these chambers. A unit may consist of 3, 4, 5 or more such chambers depending somewhat on the product being formed and the differences in starting and ending temperatures necessary.

Between and connecting the various chambers are the pipe lines 29 and 32 having gas traps 31 and 33. Through these lines the reaction mixture flows from one reaction chamber to the next. For the purpose of draining the system, auxiliary connecting lines 34 and 35 may be provided which are normally maintained closed by means of valves 36 and 37.

The last chamber is connected by a pipe line 38 and 39 to a condenser or cooler 41 which may consist of a brine tank or air chamber containing a heat transfer coil 42. The products of reaction from the last reaction chamber are condensed or cooled in the coil to a suitable temperature for future treatment, such as washing with dilute caustic soda, rinsing and refluxing with a water soluble permanganate, bone char or other suitable color removing and purifying medium. One advantage of the permanganate treatment is to remove the last traces of cresol that may have been formed by saponification during the caustic soda treatment.

Connected with the header 14 of the preheater 13 and to each of the reaction chambers 24, 27 and 28 are reflux condensers 43, 44, 45 and 46, respectively. The reflux condensers may be of any suitable type, for example, bubble towers, cooled coils, etc. These condensers are adapted to condense the reaction liquids and return the same to their respective retorts by means of return pipes 47, 48 and 49, while allowing the gaseous products, such as hydrochloric acid gas, to be carried off through the flue 51, to be recovered.

Each reaction chamber is provided with means for supplying an inert gas such as carbon dioxide. The means of supplying the inert gas may consist of a header 52 with leads 53, 54 and 55 therefrom running into the respective reaction chambers. The lead lines are preferably equipped with valves for regulating the quantity of inert gas supplied and distributing heads 56 for distributing the inert gas in the reacting chamber.

The flue 51 that is connected to the reaction chambers through the condensers 44, 45 and 46 may be so equipped with a suction device that a pressure below atmospheric pressure may be maintained in the reaction chambers.

In operation, chemically equivalent proportions of alkyl and/or aryl compounds and a phosphoric compound are mixed in the mixing tank 11 from which they are led to the heat exchanger 13 where they are heated to from 70° to 140° C., depending upon the amount of heat contained in the gas or air coming from the heating elements of the reaction chambers. If the material being formed is tricresyl phosphate, which is used only as an example of the many other phosphates that may be formed in accordance with this invention, the cresylic acid and phosphorus compounds are carried from the preheater through a flow meter 22 to the first of the reaction chambers 24. The reaction chamber 24 may be maintained at a temperature of about 150° C. causing a partial reaction of the materials with the liberation of hydrochloric acid. The hydrochloric acid is removed by means of the reflux condenser 44 and flue 51. The materials slowly move through the chamber 24 guided by the baffle plates therein and pass to a second chamber of similar construction. The products of the first reaction chamber may be heated in the second reaction chamber to about 225° C. and undergo further reaction and separation of chlorine compounds. The products of the second reaction chamber pass to a third chamber where they may be heated to about 300° C. and they there become completely reacted.

For aiding in removing chlorine containing compounds from the zone of reaction, there may be introduced into one or all the chambers an inert gas such as nitrogen or carbon dioxide or the chambers may be maintained under vacuum.

It is to be understood that the foregoing detailed description and drawing are merely given by way of illustration and many alterations may be made therein without departing from the spirit of my invention.

Having described my invention what I desire to secure by Letters Patent is.

1. A method of manufacturing phosphate esters, which comprises passing a mixture containing an organic hydroxy compound and a compound of phosphorus capable of forming a phosphate ester with the organic hydroxy compound, through a series of heated zones, each zone being maintained at a higher temperature than the zone preceding it in the series, so as to form the phosphate ester.

2. A method of manufacturing phosphate esters, which comprises passing a mixture containing substantially chemically equivalent proportions of an organic hydroxy compound and a compound of phosphorus capable of forming a phosphate ester with the organic hydroxy compound, through a series of heated zones, each zone being maintained at a higher temperature than the zone preceding it in the series, so as to form the phosphate ester.

3. A method of manufacturing tricresyl phosphate, which comprises passing a mixture containing cresol and a compound of phosphorus capable of forming a tricresyl phosphate with said cresol, through a series of heated zones, each zone being maintained at a higher temperature than the zone preceding it in the series, so as to form the tricresyl phosphate.

4. A method of manufacturing tricresyl phosphate, which comprises passing a mixture containing substantially chemically equivalent proportions of cresol and a compound of phosphorus capable of forming a tricresyl phosphate with said cresol, through a series of heated zones, each zone being mantained at a higher temperature than the zone preceding it in the series, so as to form the tricresyl phosphate.

5. A method of manufacturing tricresyl phosphate, which comprises passing a mixture containing cresylic acid and a compound of phosphorus capable of forming tricresyl phosphate with said cresylic acid, through a series of heated zones, each zone being maintained at a higher temperature than the zone preceding it in the series, so as to form the tricresyl phosphate.

6. A method of manufacturing tricresyl phosphate, which comprises passing a mixture containing cresylic acid and a compound of phosphorus capable of forming tricresyl phasphate with said cresylic acid, through a series of heated zones, the first zone being maintained below 140° C. and succeeding zones being maintained at 150° C., 225° C. and 300° C., respectively, to form the tricresyl phosphate.

7. A method of manufacturing tricresyl phosphate, which comprises passing a mixture containing cresylic acid and a compound of phosphorus capable of forming tricresyl phosphate with said cresylic acid, through a series of heated zones containing an inert gas, each zone being maintained at a higher temperature than the zone preceding it in the series, so as to form the tricresyl phosphate.

8. A method of manufacturing tricresyl phosphate, which comprises passing a mixture containing cresylic acid and a compound of phosphorus capable of forming tricresyl phosphate with said cresylic acid, through a series of heated zones, each zone being maintained at a higher temperature than the zone preceding it in the series, so as to form the tricresyl phosphate and refluxing at each zone to remove low boiling products as they are formed.

ROYAL L. SHUMAN.

Certificate of Correction

Patent No. 2,078,421.  April 27, 1937.

ROYAL L. SHUMAN

It is hereby certified that errors appear in the printed specification of the above numbered patent requiring correction as follows: Page 2, first column, line 6, strike out the formula and insert instead—$3XC_nH_yOH + POCl_3 = (XC_nH_yO)_3PO + 3HCl$.

Page 3, second column, line 48, claim 6, for "phasphate" read *phosphate*; and that the said Letters Patent should be read with these corrections therein that the same may conform to the record of the case in the Patent Office.

Signed and sealed this 25th day of May, A. D. 1937.

[SEAL]

HENRY VAN ARSDALE,
*Acting Commissioner of Patents.*